US006572134B2

(12) United States Patent
Barrett et al.

(10) Patent No.: US 6,572,134 B2
(45) Date of Patent: *Jun. 3, 2003

(54) MULTI-FEATURE STROLLER AND INFANT CAR SEAT

(75) Inventors: Robert Barrett, Angola, NY (US); Michael Green, Youngstown, OH (US); Mary Ann Celestina-Krevh, Euclid, OH (US); LeNard Pope, Cleveland, OH (US); William Ward, Jr., Uniontown, OH (US); Robert Warner, Jr., Akron, OH (US)

(73) Assignee: Graco Children's Products Inc., Exton, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,461

(22) Filed: Oct. 23, 1998

(65) Prior Publication Data

US 2001/0040357 A1 Nov. 15, 2001

(51) Int. Cl.[7] .................................................. B62B 1/00
(52) U.S. Cl. ................. 280/650; 280/47.4; 297/256.16; 297/423.12
(58) Field of Search ........................... 280/30, 642, 643, 280/648, 650, 47.38, 47.4; 297/70, 423.12, 250.1, 256.16

(56) References Cited

U.S. PATENT DOCUMENTS

| | | | | |
|---|---|---|---|---|
| 1,665,811 A | * | 4/1928 | Haddeb | 280/823 X |
| 1,943,066 A | * | 1/1934 | Ford | 280/823 X |
| 2,534,539 A | | 12/1950 | Topper | 155/22 |
| 2,546,871 A | | 3/1951 | Schley | 155/172 |

(List continued on next page.)

FOREIGN PATENT DOCUMENTS

| | | | |
|---|---|---|---|
| EP | 0 901 953 A | 3/1999 | |
| GB | 2 152 447 A | 8/1985 | |
| TW | 293337 | 12/1996 | ............. B62B/7/04 |
| WO | WO 98/31581 | 7/1998 | |

OTHER PUBLICATIONS

Century Products Company, Macedonia, Ohio, "Century Adventure Stroller" advertisement, 2 pages, (1996).
Evenflo 1997 advertisement, 3 pages, (1997).

Primary Examiner—Brian L. Johnson
Assistant Examiner—Bryan Fischmann
(74) Attorney, Agent, or Firm—Foley & Lardner

(57) ABSTRACT

A multi-feature stroller (100) includes several unique features. The stroller, which has a forward sub-frame (104) and a rearward sub-frame (108) that is foldable upon itself, provides a napper bar (150) which extends outwardly from Cosco "Juvenile Merchandising" advertisement, 1 page, (1997). the forward sub-frame (104). The napper bar (150) provides a locking mechanism (254) which engages one of two locking tongues (190) extending from an underside of a car seat (160). Accordingly, the car seat (160) may be carried by the stroller (100) in a forward-facing position and a rearward-facing position. The napper bar (150) is moveable between an extended position and a recessed position by actuating a release mechanism (302). A fold down mechanism (130) is connected between the rear sub-frame (108) and the forward sub-frame (104) when actuated causes the sub-frames to fold into a collapsed position and simultaneously causes the napper bar to fall to its recessed position. The stroller (100) is also provided with an adjustable foot rest (120) that is slidable upon the forward sub-frame. A cross member (116), which extends between the forward sub-frame, supports the foot rest in one of two positions. The stroller is also provided with a lock adjustment (140) which allows height and length adjustment between a handle bar (134) and a push bar (132) that is connected to the rear and forward sub-frames. These features can be provided singly or in various combinations with one another.

16 Claims, 15 Drawing Sheets

U.S. PATENT DOCUMENTS

| | | | | |
|---|---|---|---|---|
| 4,577,877 A | | 3/1986 | Kassai | 280/47.37 R |
| 4,586,399 A | | 5/1986 | Kassai | 74/551.3 |
| 4,685,688 A | | 8/1987 | Edwards | 280/30 |
| 4,714,292 A | | 12/1987 | Kassai | 297/437 |
| 4,768,795 A | | 9/1988 | Mar | 280/30 |
| 4,786,064 A | | 11/1988 | Baghdasarian | 280/30 |
| 4,795,209 A | | 1/1989 | Quinlan, Jr. et al. | 297/153 |
| 4,832,354 A | | 5/1989 | LaFreniere | 280/30 |
| 4,861,105 A | | 8/1989 | Merten et al. | 297/250 |
| 4,909,574 A | | 3/1990 | Sedlack | 297/488 |
| 4,958,887 A | | 9/1990 | Meeker | 297/250 |
| 4,984,845 A | | 1/1991 | Knoedler et al. | 297/250 |
| 5,056,865 A | | 10/1991 | Sedlack | 297/250 |
| D330,528 S | | 10/1992 | Allen et al. | D12/129 |
| 5,168,601 A | | 12/1992 | Liu | 16/126 |
| 5,184,835 A | | 2/1993 | Huang | 280/47.371 |
| 5,201,535 A | | 4/1993 | Kato et al. | 280/30 |
| 5,203,577 A | * | 4/1993 | Kato et al. | 280/643 X |
| 5,234,224 A | * | 8/1993 | Kim | 280/643 X |
| 5,306,027 A | | 4/1994 | Cheng | 280/30 |
| 5,370,441 A | | 12/1994 | Chuang | 297/250.1 |
| 5,374,073 A | | 12/1994 | Hung-Hsin | 280/30 |
| D360,393 S | | 7/1995 | Lewandowski | D12/129 |
| 5,431,478 A | | 7/1995 | Noonan | 297/130 |
| 5,454,584 A | | 10/1995 | Haut et al. | 280/642 |
| 5,460,398 A | | 10/1995 | Huang | 280/642 |
| 5,478,135 A | * | 12/1995 | Kain | 297/256.16 |
| 5,499,831 A | * | 3/1996 | Worth et al. | 280/643 X |
| 5,516,142 A | | 5/1996 | Hartan | 280/642 |
| 5,605,409 A | | 2/1997 | Haut et al. | 403/102 |
| 5,611,597 A | | 3/1997 | Lanz | 297/256.17 |
| 5,626,398 A | | 5/1997 | Wooldridge | 297/488 |
| 5,664,798 A | | 9/1997 | Huang | 280/642 |
| 5,669,663 A | | 9/1997 | Feuerherdt | 297/253 |
| 5,676,386 A | * | 10/1997 | Huang | 280/30 |
| 5,716,095 A | | 2/1998 | Lopez | 297/184.13 |
| 5,727,798 A | | 3/1998 | Walters et al. | 280/30 |
| D395,622 S | | 6/1998 | Flannery | D12/133 |
| 5,772,279 A | * | 6/1998 | Johnson, Jr. | 297/256.16 |
| D396,673 S | | 8/1998 | Micoley | D12/129 |
| 5,794,951 A | * | 8/1998 | Corley et al. | 280/30 |
| 5,833,261 A | * | 11/1998 | Brown et al. | 280/648 X |
| 5,854,924 A | | 12/1998 | Huang | 280/642 |
| 5,865,447 A | * | 2/1999 | Huang | 280/648 X |
| 5,947,555 A | * | 9/1999 | Welsh, Jr. et al. | 297/256.16 X |
| 5,997,086 A | * | 12/1999 | Gibson et al. | 297/256.16 |
| 6,017,088 A | * | 1/2000 | Stephens et al. | 297/256.16 |

* cited by examiner

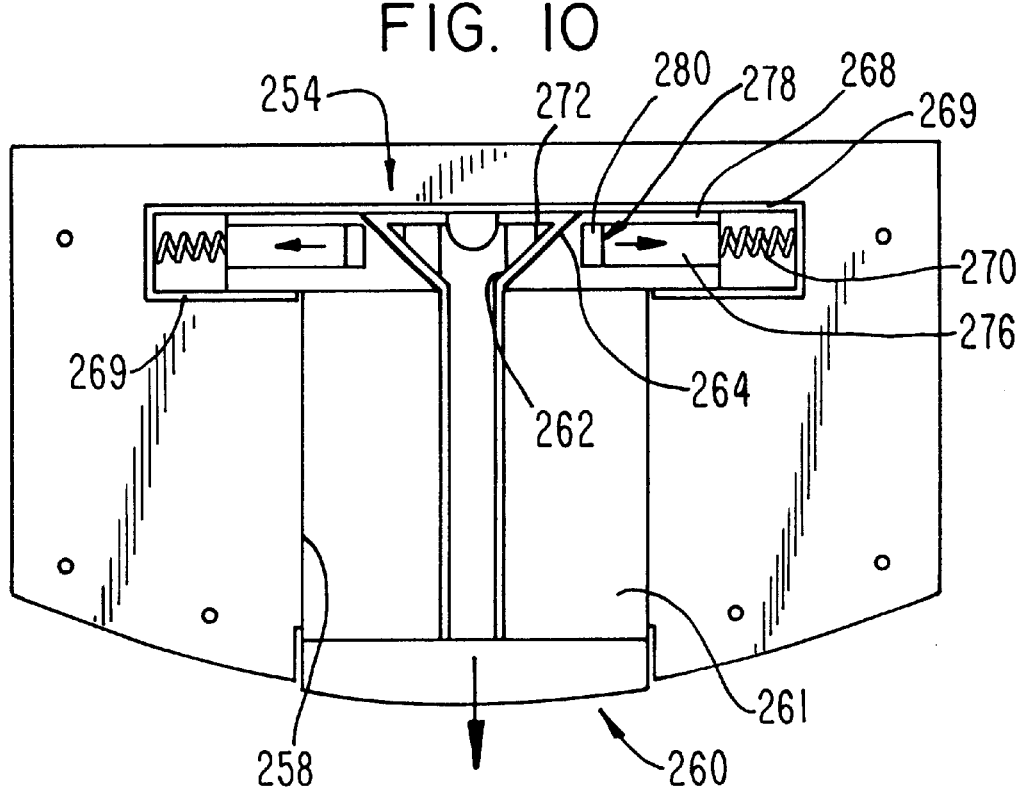
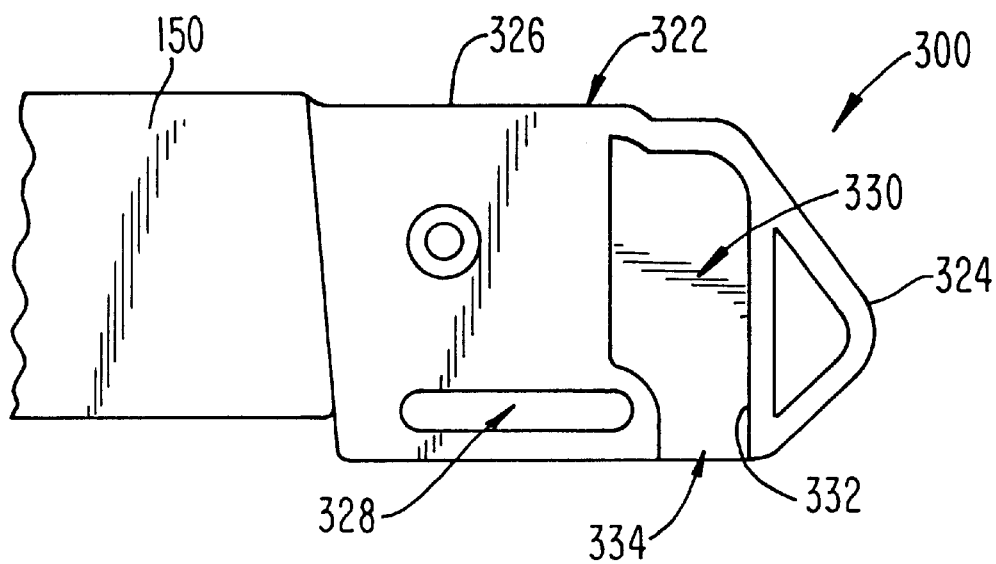

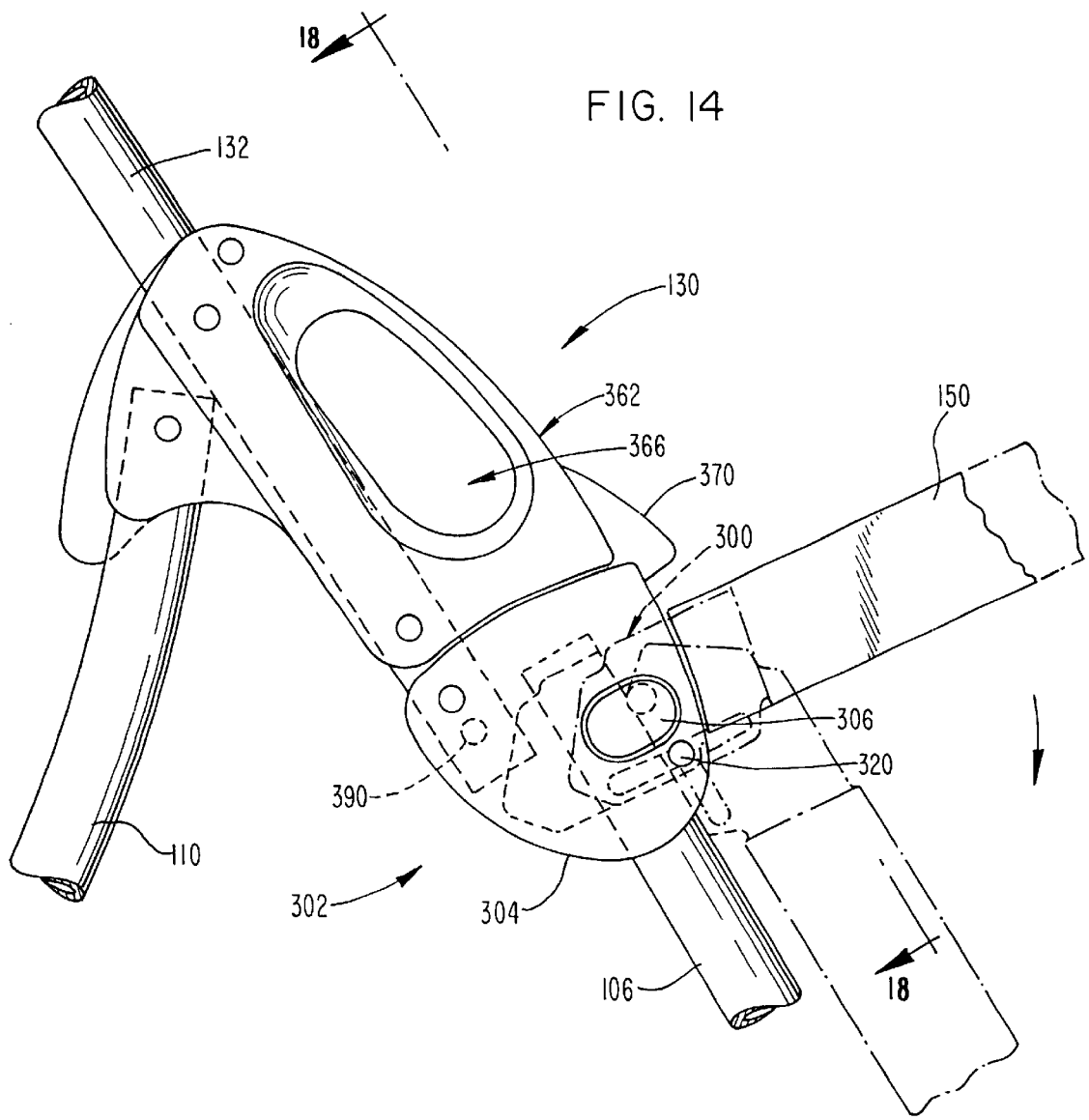

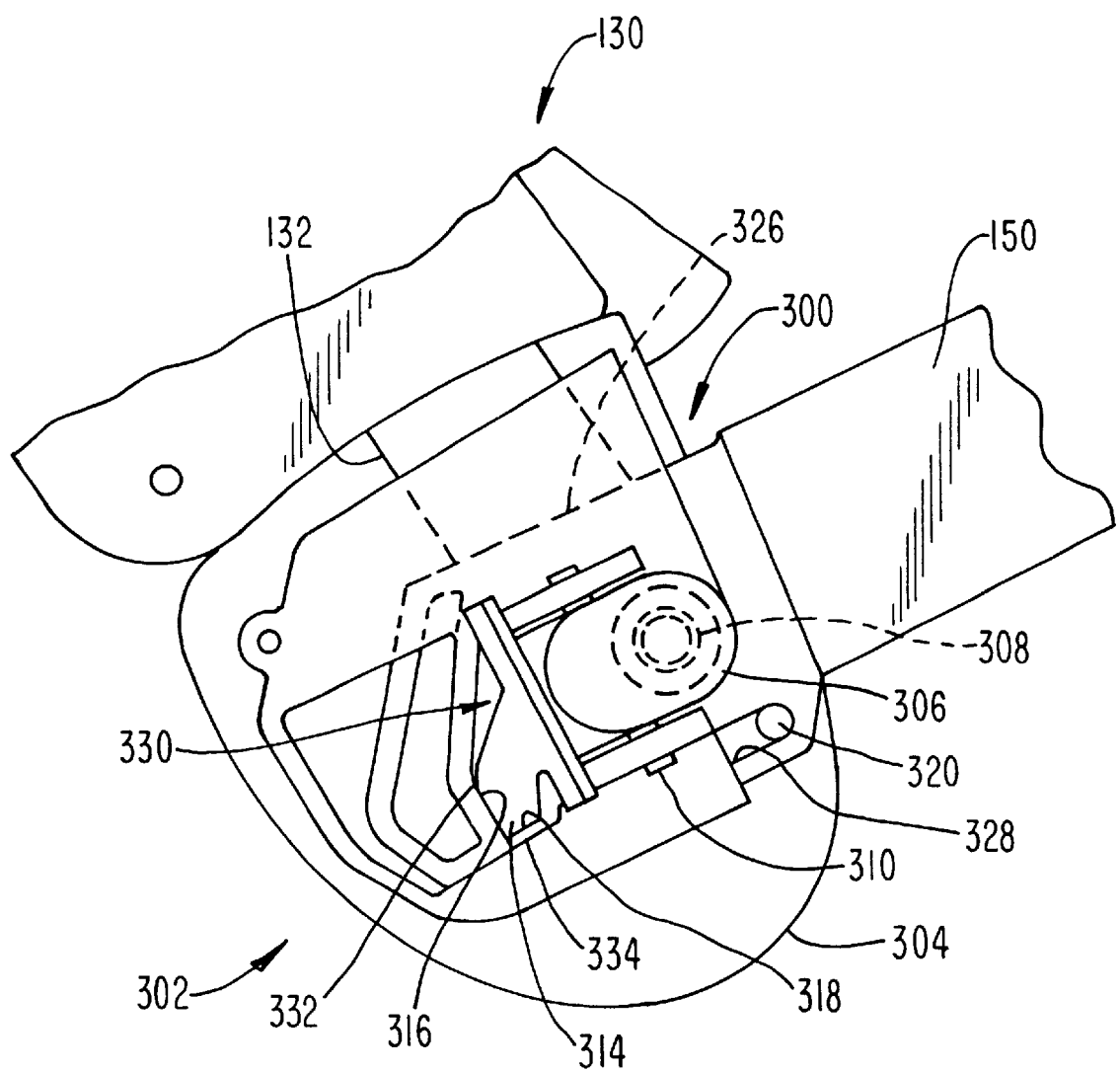

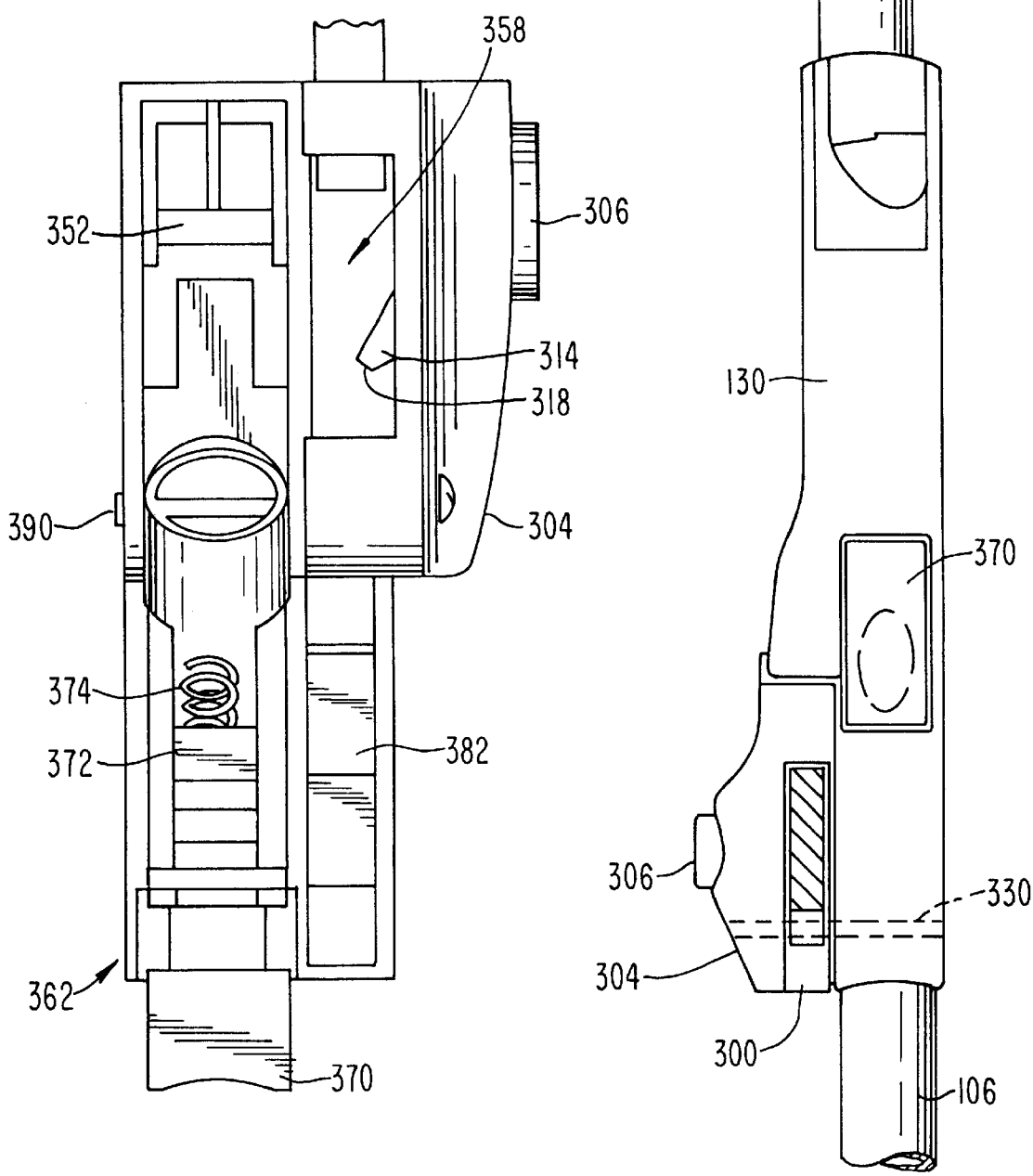

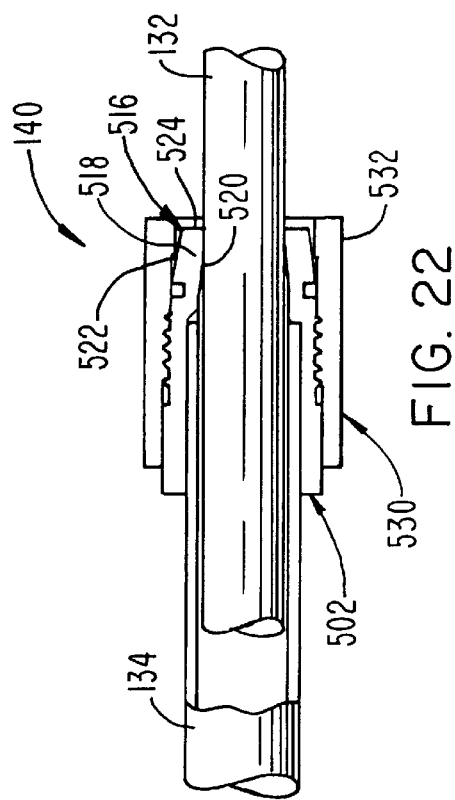
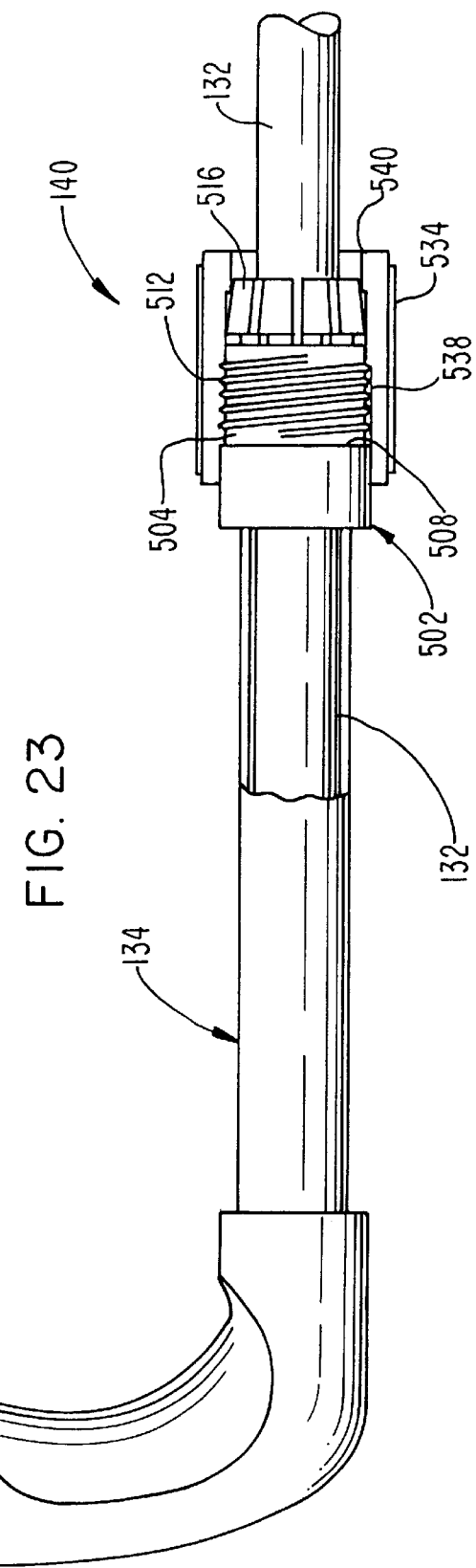

MULTI-FEATURE STROLLER AND INFANT CAR SEAT

TECHNICAL FIELD

This invention relates to a baby stroller that is foldable. More particularly, this invention relates to a stroller which is adaptable to carry a car seat in either a forward or rear-facing position. Further, this invention relates to a stroller with: a folding mechanism that automatically folds a napper bar; an adjustable foot rest; and a locking collar adjustment mechanism to extend or shorten the length of the stroller's handle.

BACKGROUND ART

It is known in the art to provide strollers with various features to facilitate their use and to enhance the comfort of the baby or toddler being transported by the stroller. It is important for all strollers to be easy to use and be foldable into a compact structure for storage.

It is known to provide a stroller that is adaptable to carry an infant car seat in either a forward-facing direction or in a rearward-facing direction. Unfortunately, if the infant is forward-facing, the caregiver cannot see the infant while pushing the stroller. If the car seat is rearward-facing, the infant cannot see where they are going or see the people passing by. These known strollers do not provide a solution to this problem.

As the child gets older, he or she may be placed directly in the stroller. Such a stroller may be provided with a napper bar upon which the child may rest its head in a forward position. Known napper bars must be separately disengaged from the stroller frame when folding the stroller. This has been found to be a time-consuming nuisance for the caregiver.

It is also known to provide strollers with an adjustable foot rest. These typically require use of an additional support bar moveable to different positions. Unfortunately, the support bar and foot rest are easily kicked out of place by the child, thus defeating the purpose of the foot rest.

It is also known to provide strollers with adjustable length handles to accommodate the gait of the person pushing the stroller. However, these adjustment mechanisms have been found deficient in their ability to maintain a desired length. Additionally, these mechanisms are somewhat difficult to use.

Unfortunately, there is no known stroller which provides solutions to the aforementioned problems in one combined stroller. Thus, the need exists for a stroller with multiple feature which facilitate the ease of use of the stroller and the comfort of the child riding in the stroller.

DISCLOSURE OF THE INVENTION

It is thus an object of the present invention to provide a multi-feature stroller and infant car seat.

It is another object of the present invention to provide a stroller, as above, in which a car seat may be detachably mounted to the stroller in a forward-facing position and a rearward-facing position.

It is still another object of the present invention to provide a stroller, as above, in which a napper bar extends from a frame of the stroller, and wherein a locking mechanism is provided by the napper bar to detachably receive the car seat in either facing position.

It is still another object of the present invention to provide a stroller, as above, in which a padded flap extends from the napper bar and wherein the flap is provided with a lock tongue that is received in the locking mechanism for when the car seat is not secured to the napper bar.

It is a further object of the present invention to provide a stroller, as above, in which a release mechanism is provided to move the napper bar to a recessed position.

It is yet a further object of the present invention to provide a stroller, as above, in which a fold-down mechanism automatically releases the napper bar and collapses the frame when actuated.

It is still a further object of the present invention to provide a stroller, as above, in which an adjustable two-position foot rest is provided which is not kicked or easily dislodged by a child sitting in the stroller.

It is an additional object of the present invention to provide a stroller, as above, in which an adjustable locking collar is provided on a push handle of the stroller to adjust its position with respect to the frame.

These and other objects of the present invention, as well as the advantages thereof over existing prior art forms, which will become apparent from the description to follow, are accomplished by the improvements hereinafter described and claimed.

In general, a car seat-carrying stroller has a frame with a foldably connected forward sub-frame and a rear sub-frame. Each sub-frame has a pair of wheels mounted thereto. The forward sub-frame has a forward cross member at one end and a push bar extending in an opposite direction. The stroller is adaptable to carry a car seat which has a shell with a back support and a leg support. A back tongue extends from the shell opposite the back support and a leg tongue extends from the shell opposite the leg support. A napper bar extends from the frame away from the rear sub-frame to allow the child to rest its head when sleeping in a forward position. The napper bar has a locking mechanism to detachably receive either the back tongue or the leg tongue which allows the car seat to be either rearward-facing or forward-facing with respect to the stroller. The napper bar is foldable between an extended position and a recessed position. A fold-down mechanism connects the rear sub-frame to the forward sub-frame wherein actuation of the fold-down mechanism causes the sub-frames to collapse into a storage position. The fold-down mechanism is coupled to the napper bar and releases the napper bar to the recessed position when actuated. An adjustable foot rest has a body slidable upon the forward sub-frame. The body includes a front rim and a back rim and at least one segment extending therebetween an underside of the body. The underside of the foot rest also provides a collar extending between the front rim and the segments. Accordingly, the body may be positioned between the segments and the collar or within the collar. At least one lock adjustment connects the push bar, which extends from the frame, to a handle bar. The lock adjustment has a collar secured to either the push bar or the handle bar and a rotational lock moveable with the respect to the lock adjustment, wherein loosening of the lock adjustment allows slidable movement of the push bar with respect to the handle bar. Tightening of the lock adjustment precludes movement of the handle bar with respect to the push bar.

In accordance with another aspect of the present invention, the napper bar may be provided with a flap which has secured to its distal end a flap tongue which is receivable in the locking mechanism of the napper bar. This covers the locking mechanism when not in use and provides padded surface on the napper bar.

In accordance with yet another aspect of the present invention, each of the above-identified features may be singly provided or in combination with one another as deemed appropriate.

The preferred stroller incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 10 is a plan view of a locking mechanism, taken along line 10—10 of FIG. 9, carried by the napper bar.

FIG. 13 is an elevational view of an end of the napper bar.

FIG. 14 is a fragmented side-elevational view, in partial cross-section, showing a release mechanism of the napper bar.

FIG. 15 is a fragmented cross-sectional view of the release mechanism.

FIG. 17 is a fragmented top view taken along line 17—17 of FIG. 16 showing the release mechanism and the fold-down mechanism in an open position.

FIG. 18 is a fragmented elevational view taken along line 18—18 of FIG. 14, of the fold-down mechanism and the release mechanism.

FIG. 22 is a fragmented elevational view, in partial cross-section of the lock adjustment.

FIG. 23 is a fragmented, partial cross-sectional view of the lock adjustment showing the collar of the locking adjustment.

PREFERRED EMBODIMENT FOR CARRYING OUT THE INVENTION

Figure 1:
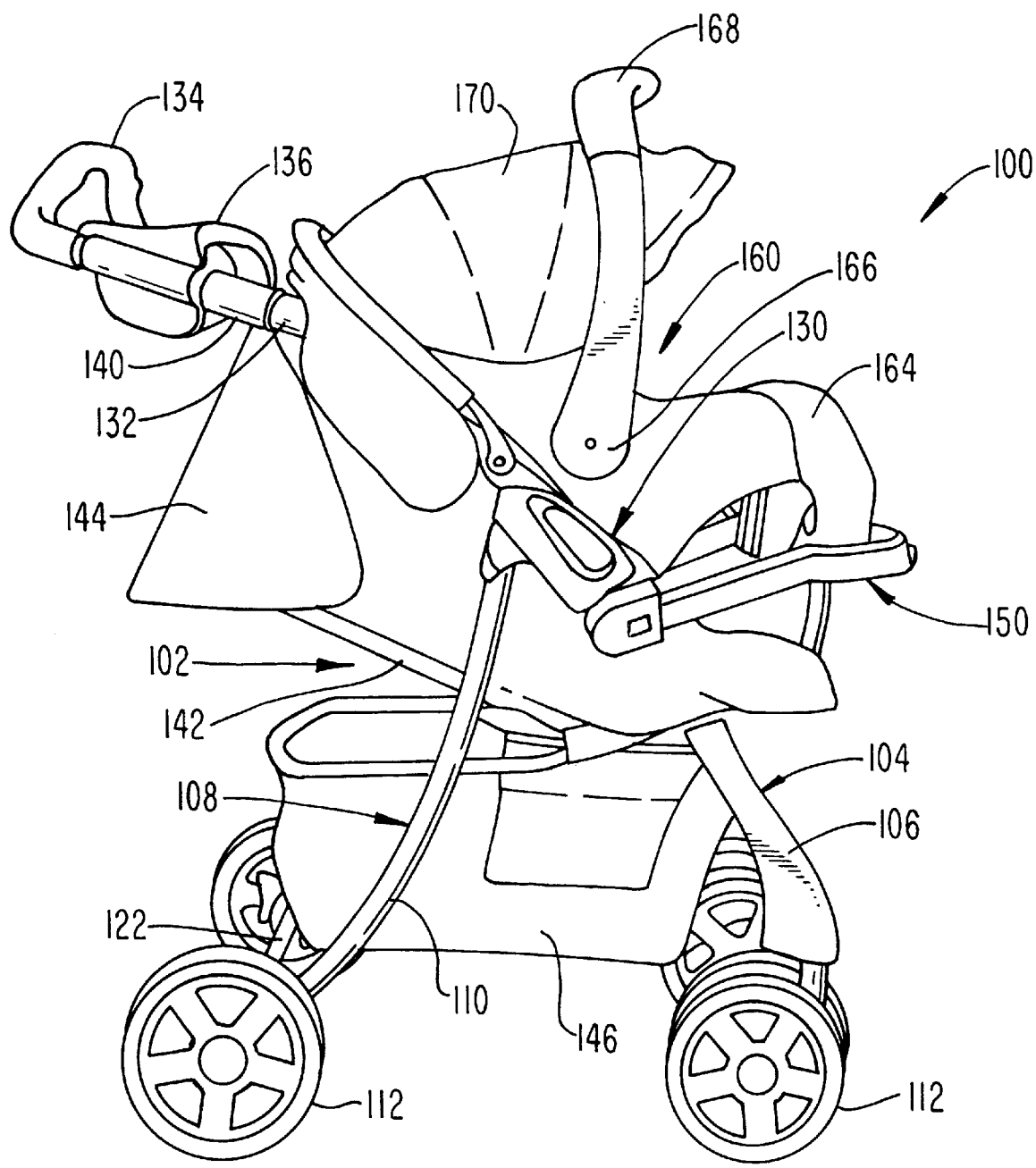
FIG. 1 is a side perspective view of a stroller of the present invention shown in a use position with a car seat detachably mounted thereto in a forward-facing position.

A multi-feature stroller and infant car seat made in accordance with the concepts of the present invention is indicated generally the numeral 100 in the accompanying drawings and is best seen generally in FIGS. 1–4. Stroller 100 includes a frame 102 which is generally A-shaped when viewed from the side. Frame 102 includes a forward sub-frame 104 which consists of forward side members 106. Foldably connected to forward sub-frame 104 is a rear sub-frame 108 which provides rear side members 110. Each member 106 and 110 has a wheel 112 rotatably mounted thereto. These wheels may be provided with locking brakes and other features as is well known in the art. A forward cross member 116 connects ends of forward members 106 proximal wheels 112. An adjustable foot rest, which is indicated generally by the numeral 120, is slidably positioned upon forward members 106 and rests upon forward cross member 116. A rear cross member 122 interconnects ends of rear members 110 proximal wheels 112. Cross members 116 and 122 provide structural stability to stroller 100 in a manner well known in the art.

A fold mechanism 130 detachably interconnects forward sub-frame 104 to rear sub-frame 108. Actuation of fold mechanism 130 allows folding of stroller 100 for storage when not in use. Push bars 132 extend angularly upward from fold mechanism 130 away from forward sub-frame 104 and in the same general direction as rear sub-frame 108.

A handle 134 is coupled to push bars 132. A cup tray 136 may be provided across push bars 132 for the convenience of the individual pushing stroller 100. Push bars 132 and handle 134 may be interconnected by lock adjustments, which are generally indicated by the numeral 140. Lock adjustments 140 allow for positional adjustment of handle 134 with respect to push bar 132. Generally, this allows individuals with a longer gait to walk behind stroller 100 without inadvertently kicking rear sub-frame 108 or attached wheels.

A child support structure 142 is carried by frame 102 in a manner well known in the art. A sun shade 144 may be employed to cover support structure 142 or shade 144 may be retracted back to a recessed position adjacent push bar 132. A storage basket 146 may be suspended from sub-frames 104 and 108 and is positioned below structure 142. Storage basket 142 may receive a diaper bag, toys, or other items.

A napper bar, which is indicated generally by the numeral 150, extends from fold mechanism 130 in a direction opposite rear sub-frame 108. When the car seat is detached, napper bar 150 is normally employed by the toddler to rest his or her head when sleeping in a forward position. Napper bar 150 also functions to prevent inadvertent bumping of the child from a forward direction. Other advantages of napper bar 150 will become apparent as the detailed description proceeds.

Figure 2:
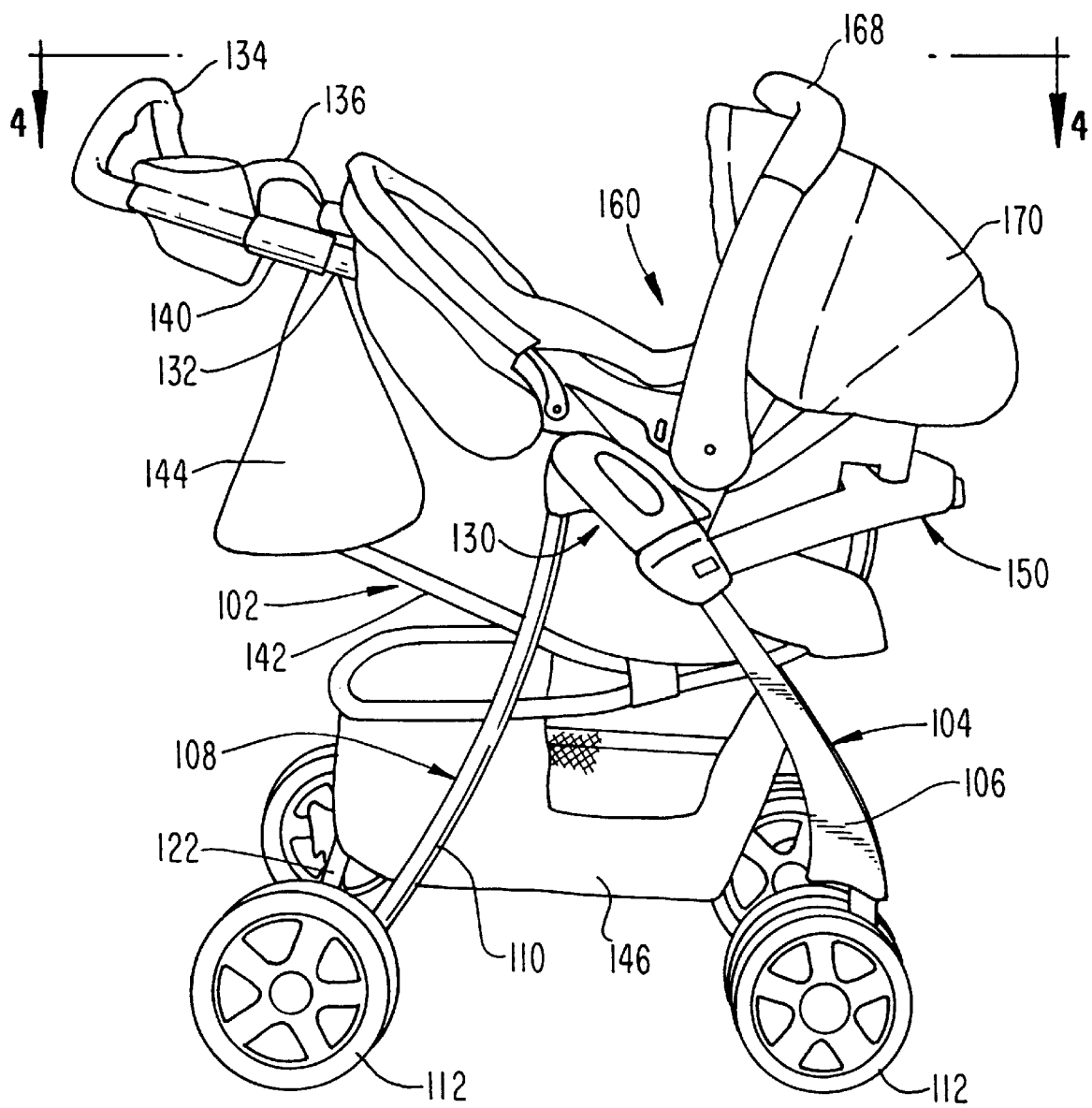
FIG. 2 is a side perspective view showing the car seat in a rear-facing position.
Figure 3:
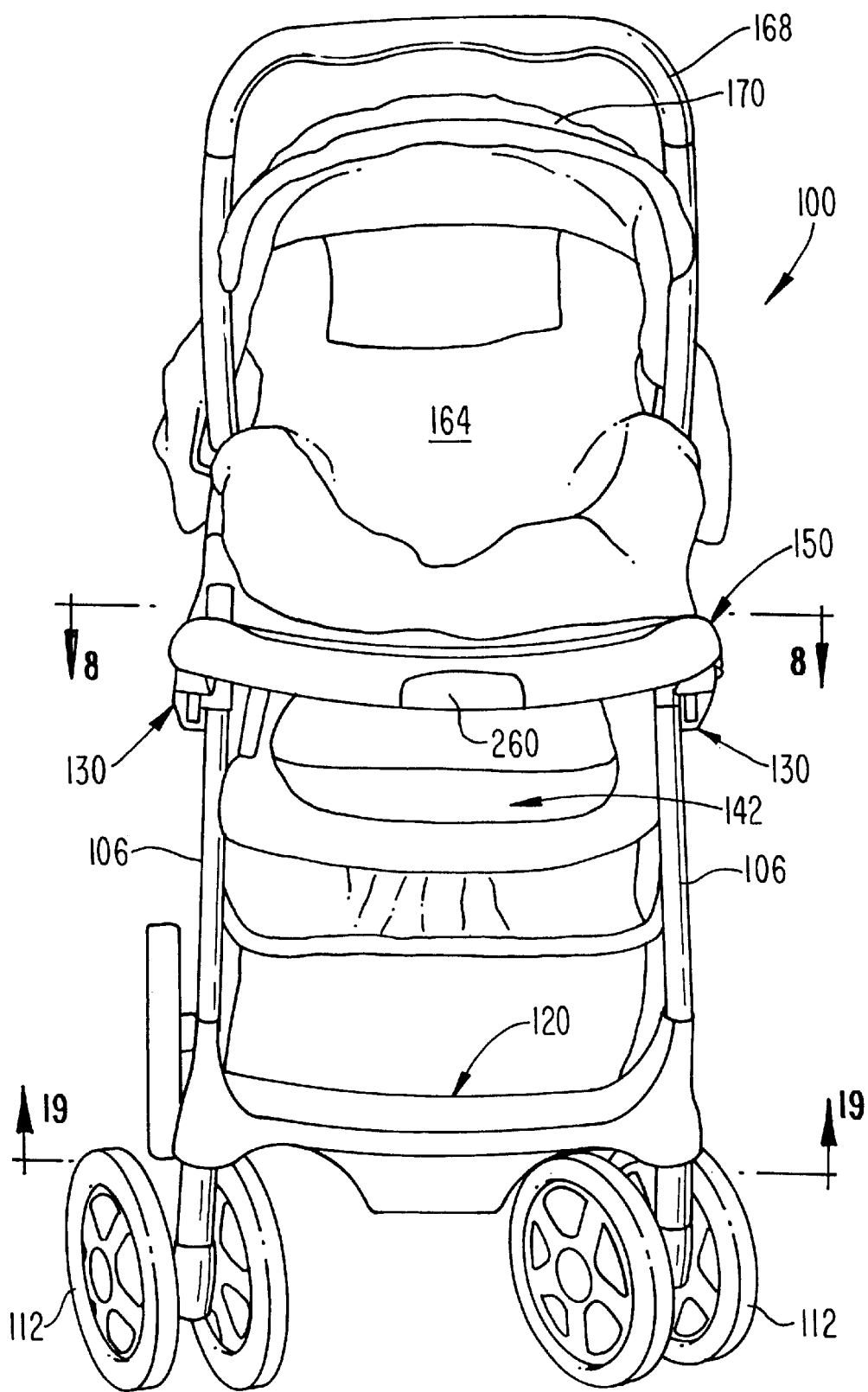
FIG. 3 is a front perspective view showing the car seat in a forward-facing position.
Figure 4:
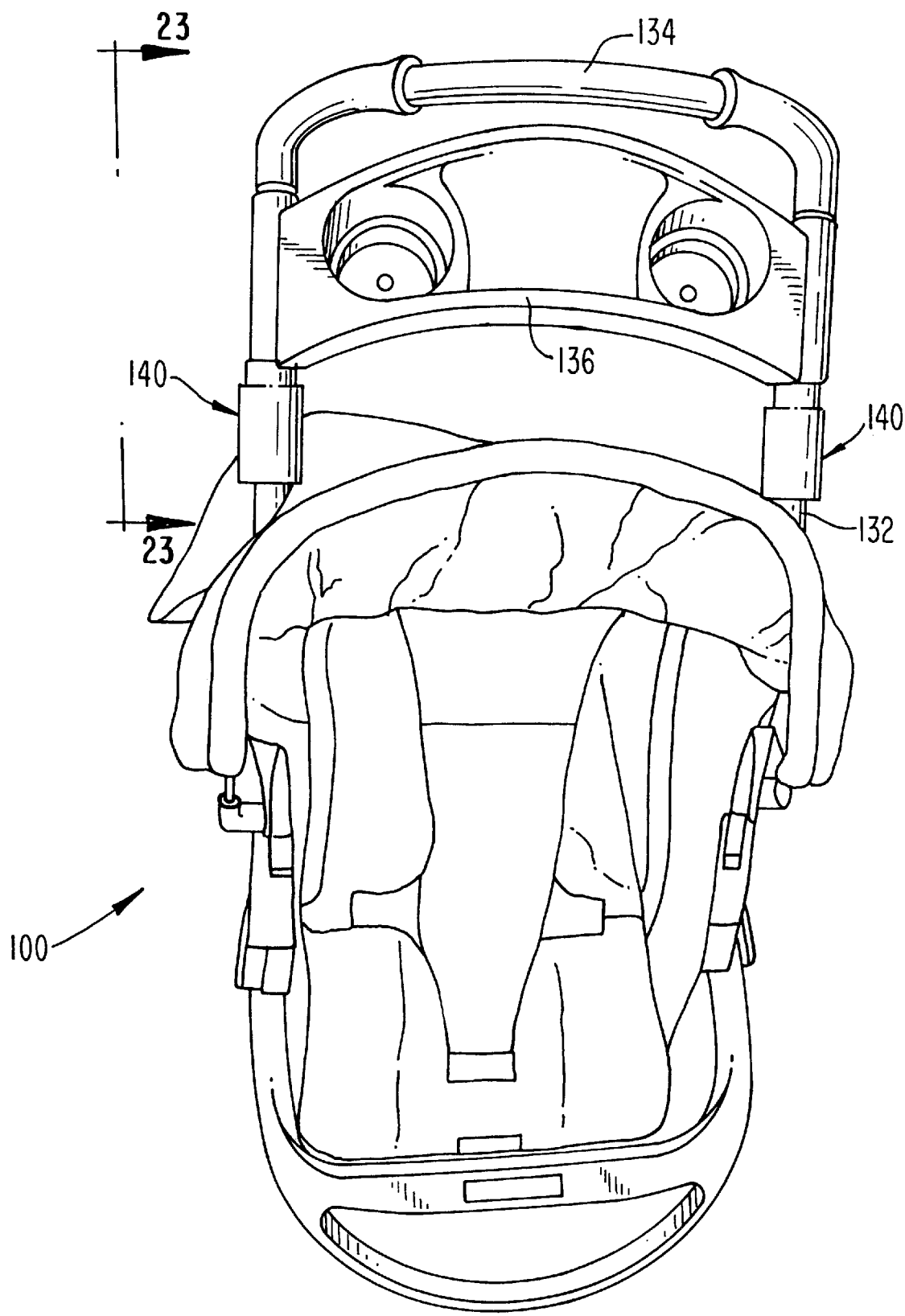
FIG. 4 is a top perspective view of the stroller taken along line 4—4 of FIG. 2 with the car seat shown in a forward-facing position.
Figure 5:
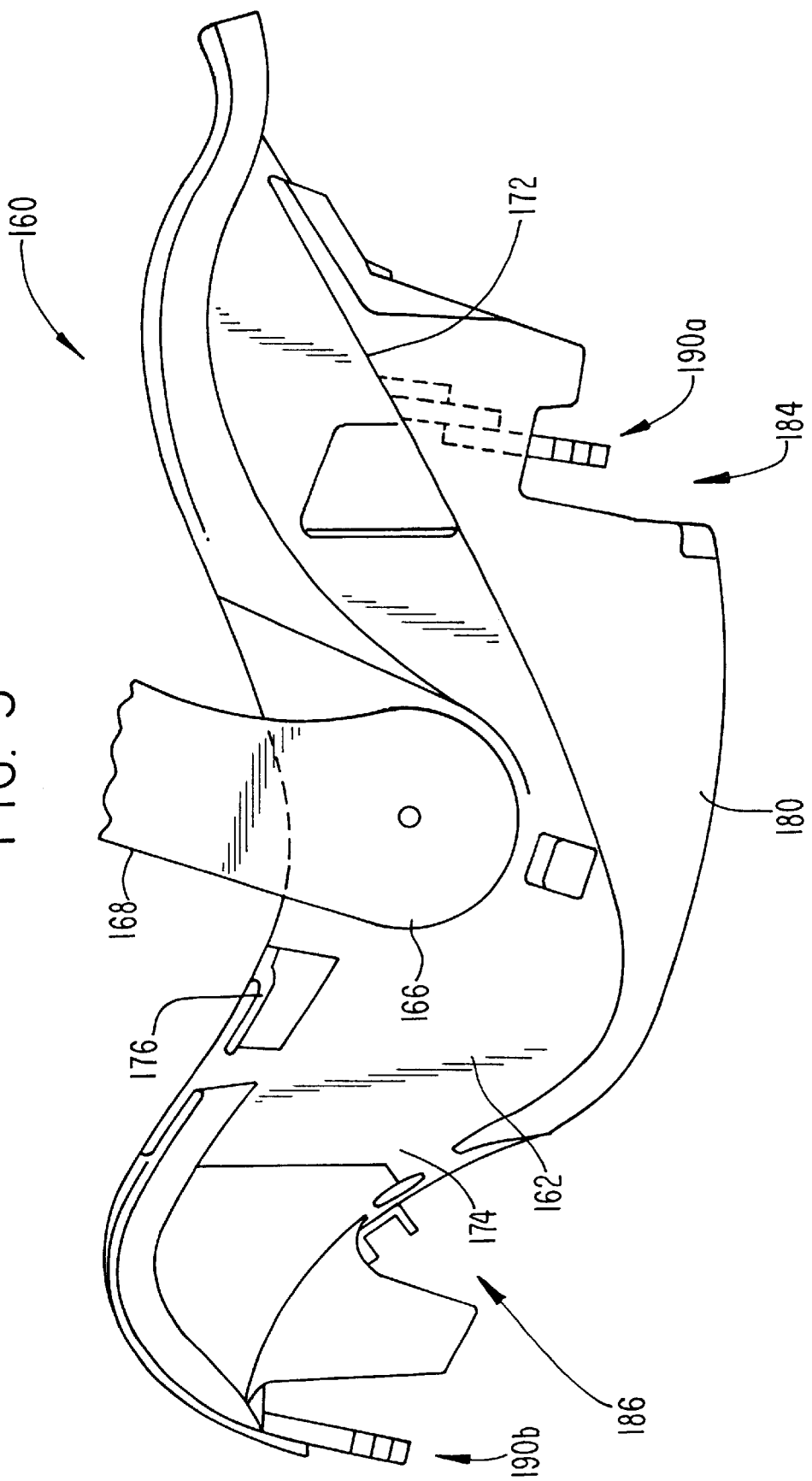
FIG. 5 is an elevational view of a car seat detachably mountable to the stroller.
Figure 6:
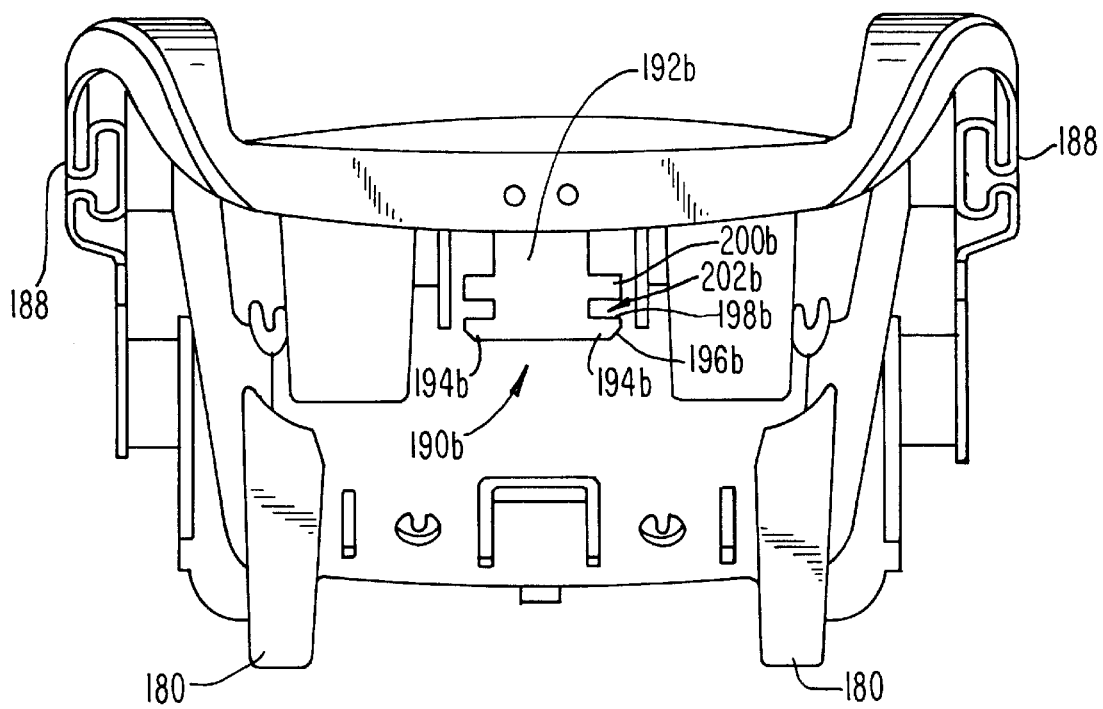
FIG. 6 is a front elevational view of the underside of the car seat.
Figure 7:
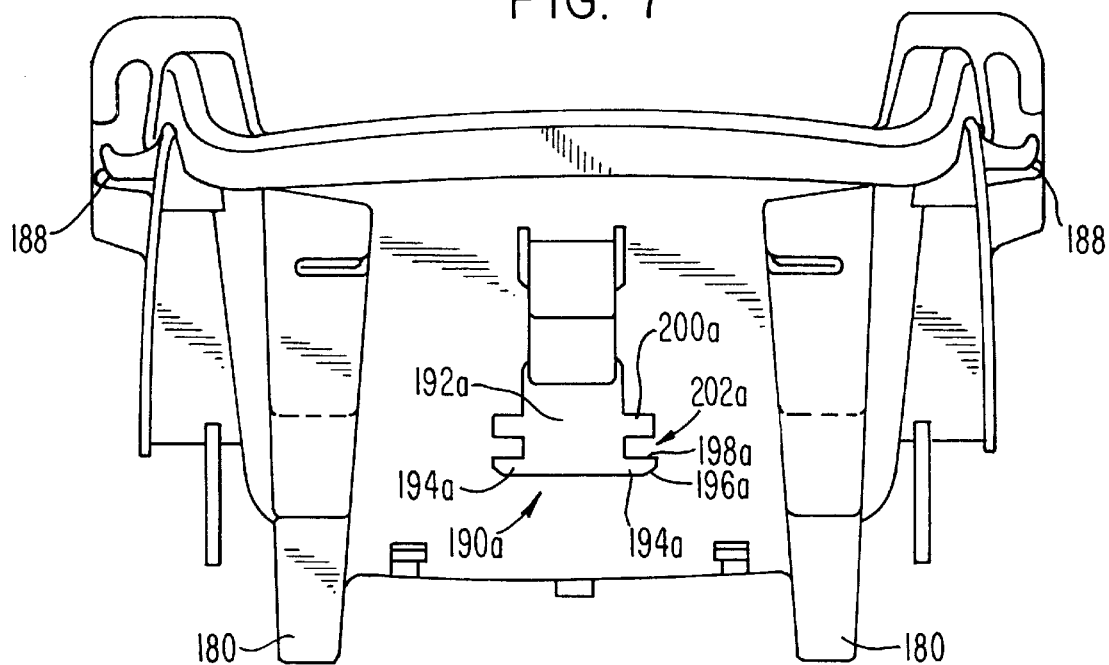
FIG. 7 is a rear elevational view of the underside of the car seat.
Figure 8:
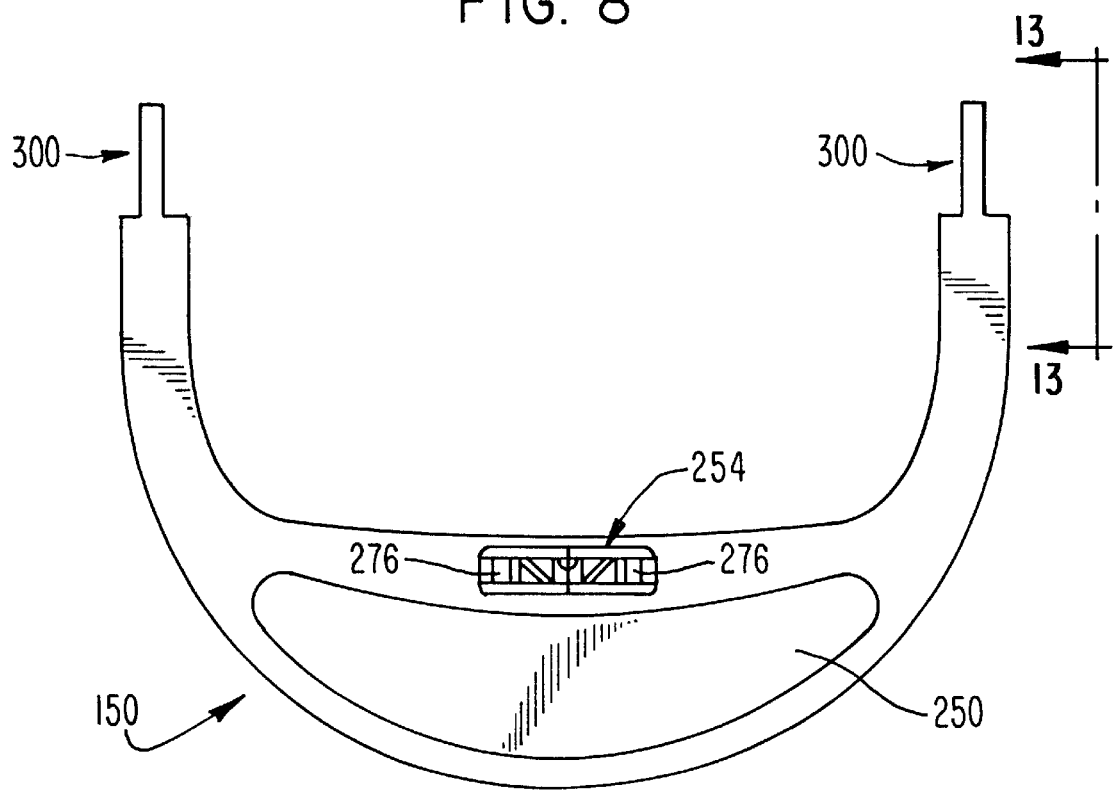
FIG. 8 is a plan view of a napper bar, taken along line 8—8 of FIG. 3, that is attachable to the stroller.
Figure 9:
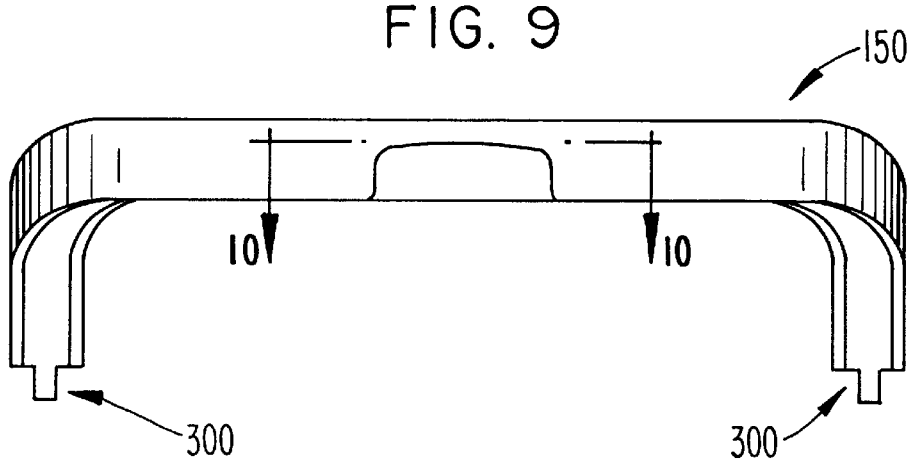
FIG. 9 is a front elevational view of the napper bar.

A car seat, generally indicated by the numeral 160, which is shown generally in FIGS. 1–4 and in detail in FIGS. 5–7, is carried by stroller 100. In particular, car seat 160 may be placed in a forward-facing position as shown in FIG. 1 and in a rearward-facing position as shown in FIG. 2. Car seat 160 is generally supported by forward sub-frame 104, push bars 132, and napper bar 150. Car seat 160 includes a shell 162 which may have padding 164 disposed thereabout for the comfort of the child. A pair of hubs 166 extend outwardly from shell 162 and provide a pivoting mechanism for a rotatable handle 168. Handle 168 may be rotated from a carrying position to a recessed or flush position as desired by the user. A shade 170 may be provided between rotatable handle 168 and a top of shell 162. Shell 162 includes a back support 172 angularly extending from a leg support 174. A seat belt slot 176 is provided through shell 162 to allow secure attachment of car seat 160 to an automobile seat in a manner well known in the art. As best seen in FIGS. 6 and 7, a pair of ribs 180 extend from shell 162 and provides structural support thereto. A back notch 184 is proximal back support 172 and extends into ribs 180. Likewise, a leg notch 186 is proximal leg support 174 and extends into ribs 180. Car seat 160 also provides side flanges 188 which are supported by push bars 132 and forward sub-frame 104.

In order to secure car seat 160 to stroller 100 in either a forward-facing or rearward-facing direction, shell 162 is provided with a tongue 190 that engages a locking mechanism provided by napper bar 150. Since both tongues extending from shell 162 are of similar construction, each will be provided with the same designating numeral. Components of a back tongue 190a are provided with an "a" suffix while components of a leg tongue 190b are provided with a "b" suffix. Back tongue 190a is medially disposed between ribs 180 as best seen in FIG. 7. Leg tongue 190b is medially positioned between ribs 180 and extends from shell 162 as best seen in FIG. 6. Each tongue 190 is provided with a body 192 with outwardly extending tabs 194. Each tab 194 has a ramp 196 that provides a lock surface 198. A stub 200 extends from body 192 and together with lock surface 198 forms a groove 202. Of course, other structural embodiments of tongue 190 could be provided to fit with any type of locking mechanism.

To fully understand how car seat 160 is detachably mounted to stroller 100, reference is made to FIGS. 5–10.

Napper bar 150 includes a tray 250 which may be used by the child as a place for holding snacks when car seat 160 is not coupled to stroller 100. A locking mechanism 254 is provided in tray 250 to receive either tongue 190a or 190b.

Details of locking mechanism 254 are best seen in FIG. 10 wherein an underside of tray 250 provides a channel 258 which slidably receives a slide bar handle 260. Handle 260 includes a plate 261 from which extends a body 262 which terminates at an inverted triangle-shaped portion. Body 262 provides body surfaces 264 that slidably engage and abut a pair of prongs 268 on each side thereof. Prongs 268 are received in respective channels 269 and are biased by a spring 270. Each prong 268 provides a cam surface 272 that abuts a corresponding body surface 264.

Figure 11:
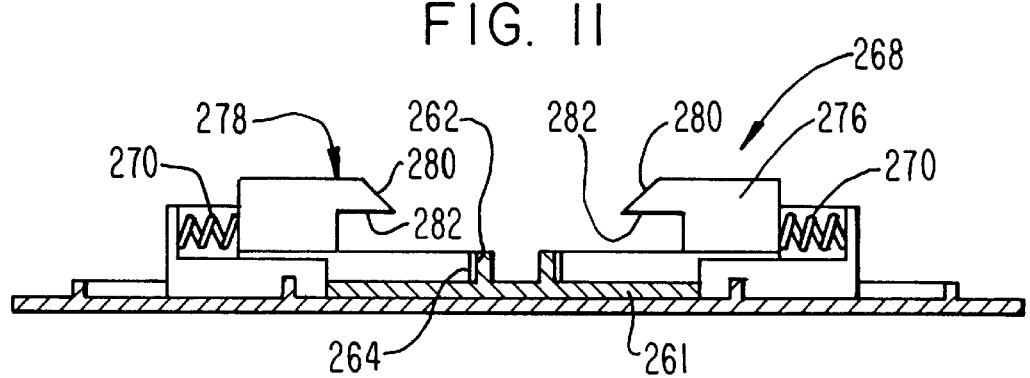
FIG. 11 is an elevational view of the locking mechanism.

As best seen in FIG. 11, prong 268 includes a pawl 276 that extends above a top surface of body 262. Each pawl 276 provides a head 278 with an incline surface 280 that bears against ramp 196 when tongue 190 is received in locking mechanism 254. As ramps 196 are pressed downwardly, they engage incline 280 and begin movement of each prong 268 away from one another. Once ramp 196 clears incline 280, lock surface 198 engages latch surface 282 and car seat 160 is engaged and coupled to locking mechanism 254. Engagement of tongue 190 in locking mechanism 254 prevents car seat 160 from being lifted off of frame 102. Engagement also precludes car seat 160 from falling off of the stroller or from being rotated from side to side. Such a mating condition also prevents rotation of car seat out of the stroller in a forward direction.

In the rear-facing mode, car seat 160 is secured to napper bar 150 and is supported at the head end by the rear edge of tray 250 through contact of notch 184 below the occupant's head. Support is also provided by horizontal surfaces of car seat 160 located at the head end of both ribs 180 and at the foot end by the support surfaces on the shell through flanges 188. In a forward-facing mode, car seat 160 is secured to napper bar 150 and is supported at the foot end by a rear edge of tray 250 through contact of the shell below the occupant's feet and at the head by the support surfaces of the stroller handle through the lower surfaces of the handle hub on both sides of the car seat.

To remove car seat 160 from stroller 100, a user pulls on slide bar handle 260. This causes body surfaces 264 to engage each cam surface 272. This removes pawl 276 from lock surface 198, while the user simultaneously lifts up on car seat 160 to remove it from locking mechanism 254.

Figure 12:
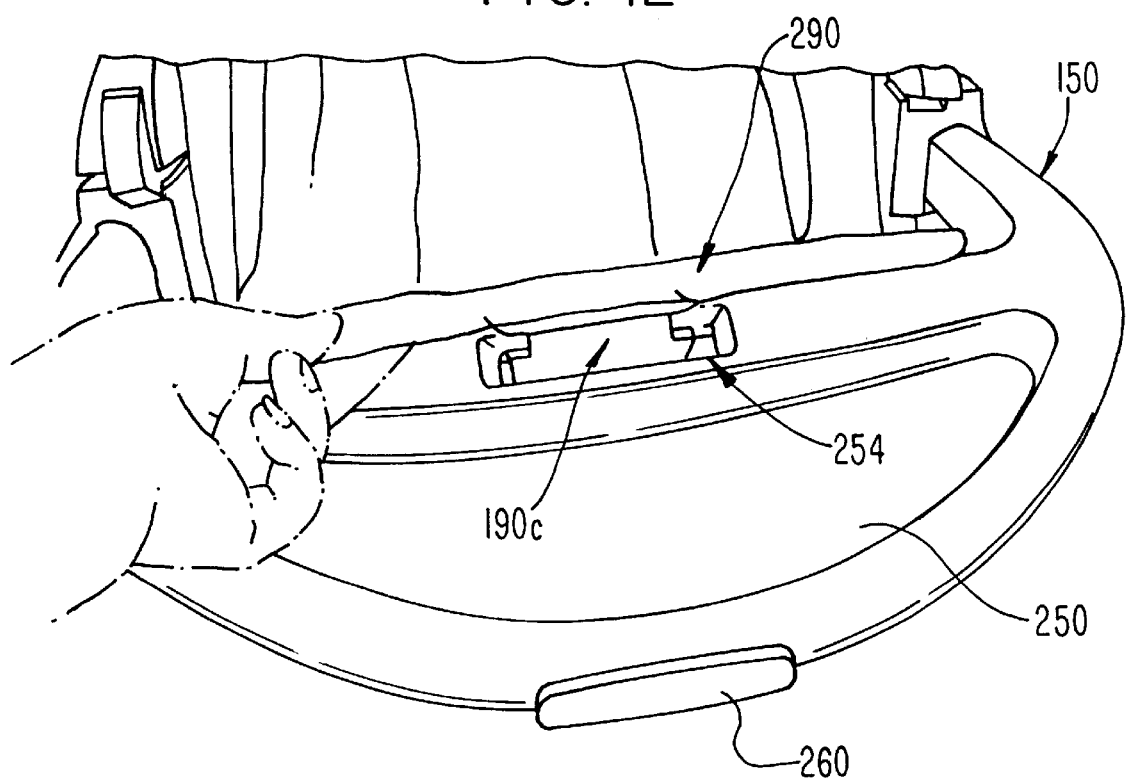
FIG. 12 is a top perspective view showing a flap tongue inserted into the locking mechanism.

A flap 290 may extend downwardly from napper bar 150 or tray 250. As seen in FIG. 12, flap 290 may be provided with a flap tongue 190c such that it wraps around an edge tray 250 and is received in locking mechanism 254 as described above for car seat 160. Accordingly, flap tongue 190c precludes entry of dirt and debris into locking mechanism 254 which might otherwise disrupt its operation. Flap 290 may be padded in such a way so as to provide a soft surface for a child to rest its head. Flap tongue 190c also precludes entry of a child's fingers into locking mechanism 254 and prevents pinching.

Napper bar 150 is coupled to forward sub-frame 104 via a release mechanism 302 as seen in FIGS. 13–18. Release mechanism 302 is contained within a release hub 304 integral with each forward member 106. In a use position, napper bar 150 extends outwardly from forward sub-frame 104. This allows the child to rest his or her head on the napper bar or to use the tray 250 for holding snacks and/or toys. In a recess position, napper bar 150 folds down below support structure 142 and lies adjacent forward members 106. In the recess position, the toddler's legs may rest upon tray 250.

Release hub 304 includes a release button 306 that is biased by a spring 308 as best seen in FIG. 15. A pivot pin 310 supports release button 306 at about a midpoint thereof such that depression of release button 306 causes rotation of release button 306 about pivot pin 310. A claw 314, which is integral with release button 306, is disposed on the other side of pivot pin 310. Claw 314 provides a claw edge 316 that terminates at a claw tip 318. A slide pin 320 extends transversely from release hub 304 to engage end 300.

End 300, as best seen in FIG. 13, includes a nose 322 which terminates at a tip 324. A bar edge 326 is provided by nose 322 and is engaged by fold mechanism 130 as will be discussed below. Nose 322 provides a slot 328 along a length thereof in a position substantially opposite and parallel with bar edge 326. Disposed between slot 328 and tip 324 is a claw depression 330 which includes a claw wall 332. Claw wall 332 terminates at an edge of nose 322 opposite bar edge 326 to provide a release channel 334 contiguous with claw depression 330.

In its extended position, napper bar 150 is held in place by virtue of slide pin 320 positioned within slide slot 328 at an end closest to bar 150. Napper bar 150 is also supported by virtue of claw 314 engaging claw wall 332. As such, napper bar 150 is precluded from rotating about slide pin 320.

To release napper bar 150 from its extended position, an individual presses release buttons 306 on respective forward members 106. Simultaneously, the individual grasps napper bar 150 and pulls it outwardly from release hub 304. Pressing of release button 306 causes claw 314 to disengage claw wall 332 allows end 300 to slide on slide pin 320. Once slide pin 320 reaches the other end of slide slot 328, napper bar 150 rotates in a clockwise direction as seen in FIG. 14. This places napper bar 150 in a recessed position and allows easy access to support structure 142.

Figure 16:
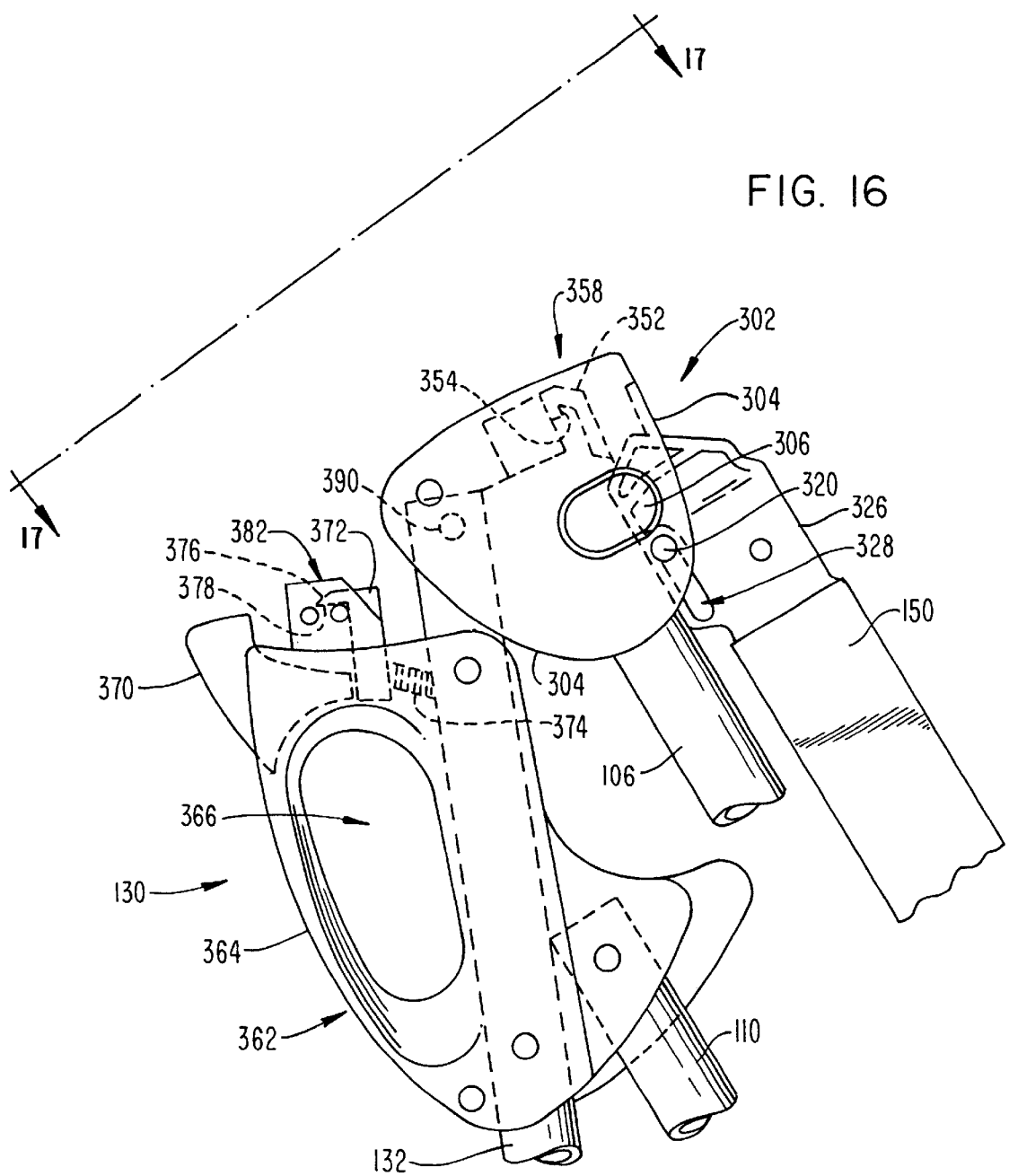
FIG. 16 is a fragmented elevational view of the release mechanism and a fold-down mechanism in a released position.

Fold down mechanism 130 coacts with release mechanism 302 such that actuation of fold down mechanism automatically places napper bar 150 in its recessed position. This eliminates the need for the user to first disengage napper bar 150 prior to actuation or folding of stroller 100. In order for fold down mechanism 130 to function in such a manner, release hub 304 is provided with a catch member 352 which provides a catch ledge 354. As best seen in FIG. 16, member 352 and ledge 354 are laterally adjacent a bar channel 358. As seen in FIG. 17, claw 314 and claw tip 318 extend into bar channel 358 when nose 300 is in a recessed position.

Fold-down mechanism 130 includes a fold hub 362 secured to each push bar 132. Each fold hub 362 includes a grip 364 which forms a grip opening 366. A thumb button 370 is disposed along grip 364 and is coupled to release hub 304. In particular, thumb button 370 includes a thumb pawl that is biased by a spring 374 against push bar 132. Thumb pawl 372 provides a ramp 376 which terminates at a thumb leg 378. A bar 382 extends from fold hub 362 and is received in bar channel 358 when fold hub 362 is adjacent release hub 304.

With napper bar 150 in either its extended or recessed position, actuation of thumb button 370 causes thumb pawl 372 to compress spring 374 and move toward push bar 132. Accordingly, thumb leg 378 disengages from catch ledge 354 to allow pivotable movement of push bar 132 with respect to forward member 106 about a fold pin 390.

When napper bar 150 is in its extended position, actuation of thumb button 370 functions as described above. Additionally, counterclockwise movement of grip 364, as seen in FIG. 16, causes disengagement of bar 382 from bar edge 326. Accordingly, since there is no force on this surface, claw 314, by itself, can no longer maintain napper bar 150 in its extended position. Accordingly, claw 314 slidably moves along claw depression 330 and napper bar 150 rotates about slide pin 320. The primary advantage of this coaction is that napper bar 150 is automatically released from its extended position whenever fold down mechanism 130 is actuated.

Figure 19:
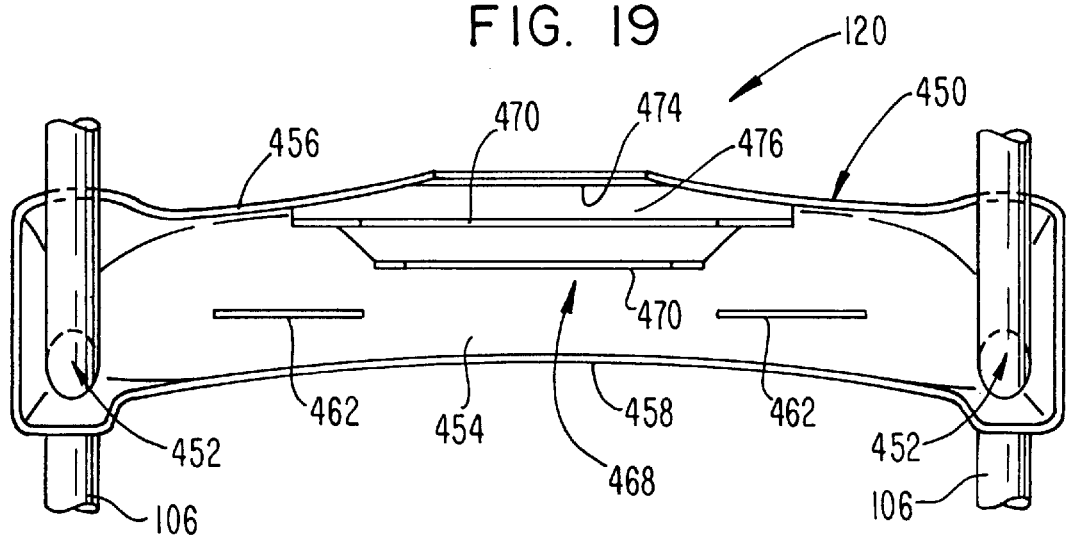
FIG. 19 is a bottom view, taken along line 19—19 of FIG. 3, of the adjustable foot rest.
Figure 20:
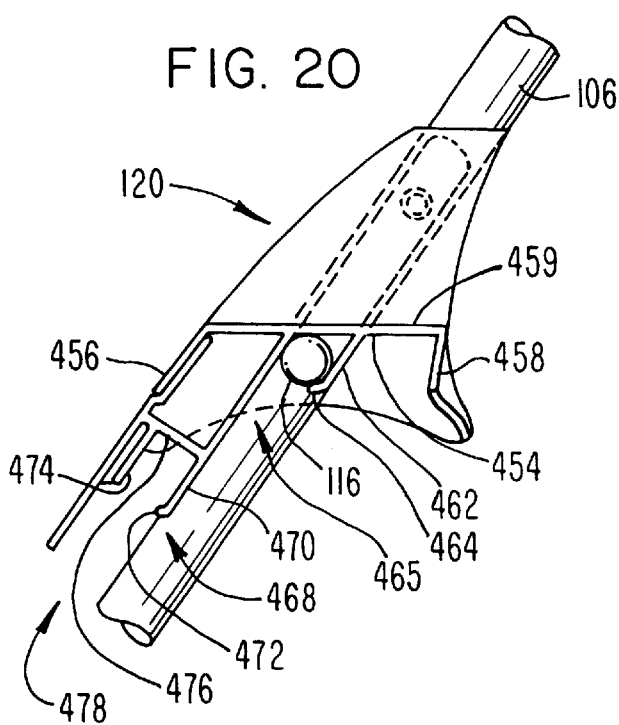
FIG. 20 is a fragmented elevational view, in partial cross-section, of the foot rest in a first position.
Figure 21:
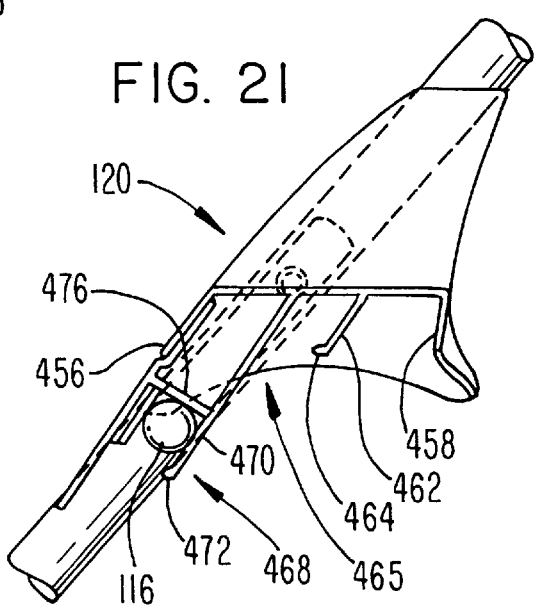
FIG. 21 is a fragmented elevational view, in partial cross-section, of the foot rest in a second position.

Another unique feature of stroller 100 is adjustable foot rest 120 as best seen in FIGS. 19–21. Foot rest 120 includes a body 450 with openings 452 at each end. Openings 452 allow slidable movement of body 450 upon frame members 106. Body 450 has an underside 454 from which extends a front rim 456 and a back rim 458. The foot plate 459 is opposite underside 454 and provides a place for a child sitting in support structure 142 to rest his or her feet. A pair of segments 462 extend from underside 454 proximal back rim 458 and substantially parallel therewith. Each segment 462 has a deflectable ridge 464 extending toward front rim 456. This forms a channel 465 for receiving front cross member 116 in a low position. A collar 468 is formed on underside 454 adjacent front rim 456. Collar 468 includes a middle rib 470 disposed between front rim 456 and segments 462, a support rib 474, and a stop member 476. Middle rib 470 includes a deflectable rib ridge 472 opposite support rib 474. Stop member 476 is formed between middle rib 470 and support rib 474. Accordingly, a channel 478 is formed between middle rib 470 and support rib 474. Accordingly, as best seen in FIG. 21, front cross member 116 may be received in channel 478 and place adjustable foot rest 120 in a high position. Therefore, if the child has relatively short legs, the body 450 is grasped and pulled upwardly to deflect member 472 and is rotated forward until it is received in channel 465. Deflectable member 464 is then engaged by cross member 116 and adjustable foot rest is held in place. If it is desired to move the foot rest from a low position to a high position, the body 450 is grasped and pulled up and returned to channel 478.

Another unique feature of the stroller 100 is a provision for an adjustable handle. This allows the user to adjust the height and/or length of the handle 134 with respect to ground. This allows taller individuals, who tend to have a longer stride or "kick" distance, to not kick the rear axle if the distance between them and the stroller is too short. This is accomplished by coupling push bar 132 with handle bar 134 via lock adjustment 140.

Lock adjustment 140 includes a collar 502 which is secured to an end of handle bar 134. A sleeve 504 extends radially inwardly from collar 502. External threads 512 are disposed about the sleeve 504 in either a left-hand or right-hand configuration, depending upon which side of handle bar 134 lock adjustment 140 is disposed. Extending from sleeve 504 are a plurality of deflectable tines 516. Each tine 516 includes a block 518 which has an internal ledge 520 and an external ledge 522 which has a radially inward slope that extends downwardly from sleeve 504 to its distal end. External ledge 522 terminates at a face 524.

A rotational lock 530 is disposed over push bar 132 and is coupled to collar 502. Rotational lock 530 provides a tube 532 with longitudinal ridges 534 disposed about the outer surface to assist in gripping the rotational lock 530. Internal threads 538 are provided within the interior of tube 532 and mesh with external threads 512. An annular ring 540, which has a diameter less than the diameter of internal threads 538, is provided at the end of tube 532 opposite handle bar 134. As rotational lock 530 is rotated upon collar 502, ring 540 engages external ledge 522. As ring 540 is drawn closer to sleeve 504, tines 516 compress against push bar 132. Accordingly, handle bar 134 is secured in place. Overtravel of rotational lock 530 is prevented by virtue of ring 540 fully engaging lock 518. When it is desired to shorten or lengthen handle bar 134 with respect to push bar 132, the user loosens rotational lock in the proper direction, thus removing the compressive force upon tines 516. The user then adjusts the position of handle bar 134 and then retightens rotational lock 530.

From the foregoing, it can be seen that stroller 100 provides numerous advantages with various combinations of unique elements over previously known strollers. In particular, the car seat may be carried in either a forward- or rear-facing direction and is firmly secured to the napper bar and support structure of the stroller. If desired, the napper bar can be moved between an extended and a recessed position while allowing the stroller to remain in its use position. When the stroller is collapsed, the napper bar automatically releases from its extended position without requiring a separate operation. Another advantage of the present invention is that an adjustable foot rest is provided that is not easily dislodged by the child. Still yet another advantage of the present invention is that it provides an adjustable height or distance from the stroller to accommodate taller individuals.

In view of the foregoing, it should thus be evident that a multi-feature accomplishes the objects of the present invention and otherwise, substantially improves the art.

What is claimed is:

1. A car seat-carrying stroller having a frame with a forward sub-frame foldably connected to a rear sub-frame with wheels mounted thereto, the stroller moveable between a use position and a folded position, the forward sub-frame having a forward cross member, a push bar extends upwardly from the frame, the stroller comprising:

a car seat having a shell with a back support and a leg support, said shell having a back tongue that extends from said shell opposite said back support and a leg tongue extends from said shell opposite said leg support;

a napper bar extending from the frame away from the rear sub-frame, said napper bar having a locking mechanism to detachably receive either said back tongue or said leg tongue to allow said car seat to be either rearward facing or forward facing with respect to the stroller, said napper bar foldable between an extended position and a recessed position with respect to the frame;

a fold down mechanism connecting the rear sub-frame to the forward sub-frame, actuation of said fold down mechanism causing the sub-frames to fold into the folded position, said fold down mechanism coupled to said napper bar and releasing said napper bar automatically to the recessed position when actuated;

an adjustable foot rest having a body slidable upon the forward sub-frame, said foot rest having a front rim and a back rim, at least one segment extending between said front rim and said back rim to allow positioning of said foot rest to a first position, and a collar extending between said front rim and said back rim to allow positioning of said foot rest to a second position; and at least one lock adjustment connecting the push bar to a handle bar, said lock adjustment having a collar secured to either the push bar or said handle bar, and a rotational lock moveable with respect to said lock adjustment, wherein loosening of said lock adjustment allows slidable movement between the push bar and said handle bar, and tightening of said lock adjustment precludes movement of said handle bar with respect to the push bar.

2. A stroller for carrying a car seat, comprising:

a frame with wheels mounted thereto, said frame having a handle extending in a rearward direction:

a napper bar extending from said frame in a forward direction; and a locking mechanism carried by said napper bar for engaging a locking tongue of the car seat, said locking mechanism providing a slide bar handle to disengage the locking tongue, wherein said locking mechanism further comprises a plate integral with said slide bar handle;

a body extending from said plate and providing a body surface; and a pair of prongs slidably carried by said napper bar, each said prong having a cam surface, wherein said pair of prongs mateably engage the locking tongue, and wherein movement of said slide bar handle causes said body surfaces to move said cam surfaces, which in turn move said prongs to allow disengagement of the locking tongue.

3. The stroller according to claim 2, wherein the locking tongue has a tongue body with tabs extending therefrom, each tab having a ramp and a lock surface, said locking mechanism further comprising:

a pawl integrally extending from said prong, said pawl having an incline and a latch surface; and a spring for biasing each said prong, wherein insertion of the locking tongue into said locking mechanism causes the ramp to engage said incline which in turn moves said prong and compresses said spring until the ramp no longer engages said incline and the lock surface mates with said latch surface, and wherein pulling of said slide bar handle causes said body surface to engage said cam surface which in turn compresses said spring and causes said latch surface to disengage from the lock surface thereby releasing the locking tongue from said latching mechanism.

4. The stroller according to claim 3, wherein said body is in the shape of an inverted triangle and wherein said cam surfaces provide a corresponding angle such that each pawl moves a substantially equal amount when said slide bar handle is pulled.

5. A stroller for carrying a car seat, comprising:

a frame with wheels mounted thereto, said frame having a handle extending in a rearward direction;

a napper bar extending from said frame in a forward direction;

a locking mechanism carried by said napper bar for engaging a locking tongue of the car seat, said locking mechanism providing a slide bar handle to disengage the locking tongue; and a flap connected to said napper bar, said flap having a flap tongue receivable in said locking mechanism.

6. A stroller, comprising:

a frame having a forward sub-frame, said forward sub-frame having a forward cross member; and an adjustable foot rest slidably moveable on said forward sub-frame, said foot rest having a front rim, a back rim, at least one segment extending between said front rim and said back rim, and a collar extending between said front rim and said back rim, wherein said at least one segment and a portion of said collar define a first channel to receive said forward cross member to allow positioning of said foot rest to a first position on said forward cross member, and wherein said collar defines a second channel to receive said forward cross member to allow positioning of said foot rest to a second position on said forward cross member.

7. The stroller according to claim 6, wherein the stroller further comprises:

a push bar extending from said frame in a rearward direction;

a napper bar extending from said frame in a forward direction, said napper bar having a locking mechanism; and a car seat having two locking tongues extending from an underside thereof, either of said locking tongues receivable in said locking mechanism so that said car seat may face in one direction when received on a first said locking tongue and in a second direction when received on a second said locking tongue.

8. The stroller according to claim 7, further comprising:

at least one lock adjustment connecting a handle to said push bar, said lock adjustment having a collar secured to either said handle or said frame and a rotational lock moveable with respect to said lock adjustment, wherein loosening of said lock adjustment allows slidable movement between said push bar and said handle, and tightening of said lock adjustment precludes movement of said handle with respect to said push bar.

9. The stroller according to claim 6, wherein said frame further includes a rear sub-frame connected to said forward sub-frame; and wherein said stroller further comprises a napper bar extending from said frame in a forward direction in a use position and separately moveable to a recessed position flush with said frame, and a fold down mechanism holding said forward sub-frame and said rear sub-frame in a use position, said fold down mechanism coupled to said napper bar, wherein actuation of said fold down mechanism releases said sub-frames from the use position and said napper bar from its use position.

10. The stroller according to claim 6, further comprising:
a push bar extending upwardly from said frame away from said forward sub-frame; and
at least one lock adjustment connecting a handle to said push bar; said lock adjustment having a collar secured to either said handle or said push bar and a rotational lock moveable with respect to said lock adjustment, wherein loosening of said lock adjustment allows slidable movement between said push bar and said handle, and tightening of said lock adjustment precludes movement of said handle with respect to said push bar.

11. The stroller according to claim 6, further comprising a deflectable ridge extending from said at least one segment to engage and hold said forward cross member when received in the first position; and said collar having a middle rib with a deflectably extending rib ridge for engaging said forward cross member in the second position.

12. The stroller according to claim 6, further comprising:
a napper bar extending from said frame in a forward direction; and
a fold down mechanism connected to said frame, wherein actuation of said fold down mechanism collapses said frame and wherein said fold down mechanism is coupled to said napper bar and releases said napper bar to a recessed position when actuated.

13. The stroller according to claim 6, wherein said forward sub-frame has wheels mounted thereto and a pair of forward members, and said forward cross member connects said forward members proximal said wheels.

14. A stroller comprising:
a frame having a forward sub-frame connected to a rear sub-frame;
a napper bar extending from said frame in a forward direction in a use position, said napper bar separately moveable to a recessed position flush with said frame; and
a fold down mechanism holding said forward sub-frame and said rear sub-frame in a use position, said fold down mechanism coupled to said napper bar, wherein actuation of said fold down mechanism releases said sub-frames from the use position and said napper bar from its use position; and
wherein said fold down mechanism includes a release mechanism carried by said forward sub-frame and having two sides, one side of said release mechanism forming a bar channel and having a spring-biased release button from which integrally extends a claw, said claw extending into said bar channel that receives a bar end of said napper bar; another side of said release mechanism having a catch member which has a catch ledge; and a slide pin extending through said bar channel; said bar end having a bar slot that is slidably received on said slide pin, said bar end providing a claw wall that is engaged by said claw, wherein actuation of said release button disengages said daw from said claw wall and allows said bar slot to move about said slide pin.

15. The stroller according to claim 14, wherein said fold down mechanism further comprises:
a fold hub coupled to said rear sub-frame, said fold hub having two sides, one side of said fold hub having a spring-biased thumb button which moves a thumb pawl having a thumb leg engageable with said catch ledge, another side of said fold hub having a bar that is receivable in said bar channel and bears against said bar end when received in said bar channel, wherein actuation of said thumb button releases said thumb leg from said catch ledge to cause said forward sub-frame to move relative to said rear sub-frame and causes said bar to disengage from said bar end to allow said bar slot to move about said slide pin.

16. A stroller, comprising:
a frame including a rear sub-frame and a forward sub-frame, said forward sub-frame having a forward cross member; and
an adjustable foot rest slidably received on said forward sub-frame, said adjustable foot rest comprising:
an underside,
a first channel, formed between ribs extending from said underside of said adjustable foot rest, to receive said forward cross member and to allow positioning of said adjustable foot rest at a first position, and
a second channel, formed between ribs extending from said underside of said adjustable foot rest, to receive said forward cross member and to allow positioning of said adjustable foot rest at a second position higher than the first position relative to said forward sub-frame.

\* \* \* \* \*